US012770604B2

United States Patent

(12) United States Patent
Hansson

(10) Patent No.: US 12,770,604 B2
(45) Date of Patent: Oct. 20, 2026

(54) ACOUSTIC LEVITATION SYSTEM, COMPUTER-IMPLEMENTED METHOD FOR LEVITATING AN OBJECT, COMPUTER PROGRAM AND NON-VOLATILE DATA CARRIER

(71) Applicant: MYVOX AB, Stockholm (SE)

(72) Inventor: Josef Hansson, Sundbyberg (SE)

(73) Assignee: MYVOX AB, Stockholm (SE)

( * ) Notice: Subject to any disclaimer, the term of this patent is extended or adjusted under 35 U.S.C. 154(b) by 333 days.

(21) Appl. No.: 18/038,697

(22) PCT Filed: Dec. 13, 2021

(86) PCT No.: PCT/SE2021/051242
§ 371 (c)(1),
(2) Date: May 24, 2023

(87) PCT Pub. No.: WO2022/132002
PCT Pub. Date: Jun. 23, 2022

(65) Prior Publication Data
US 2024/0029705 A1 Jan. 25, 2024

(30) Foreign Application Priority Data
Dec. 15, 2020 (SE) .................................... 2051468-3

(51) Int. Cl.
*G10K 15/00* (2006.01)

(52) U.S. Cl.
CPC .................................... *G10K 15/00* (2013.01)

(58) Field of Classification Search
CPC ...... G10K 15/00; G10K 11/346; G10K 11/36; B06B 1/02; B06B 1/0238; B06B 1/0629;
(Continued)

(56) References Cited

U.S. PATENT DOCUMENTS 4,218,921 A * 8/1980 Oran ........................ F16C 32/00
310/90.5
4,393,706 A * 7/1983 Barmatz .................. B01J 19/10
73/570.5

(Continued)

FOREIGN PATENT DOCUMENTS

WO 2009106282 A2 9/2009
WO 2011033277 A2 3/2011

(Continued)

OTHER PUBLICATIONS

Kandemir et al. "Standing Wave Acoustic Levitation On An Annular Plate". Journal of Sound and Vibration. (Year: 2016).*

(Continued)

*Primary Examiner* — Tarun Sinha
(74) *Attorney, Agent, or Firm* — Moore & Van Allen PLLC; W. Kevin Ransom

(57) ABSTRACT

An acoustic levitation system contains an acoustic transducer array emitting acoustic energy of periodically varying intensity. The acoustic transducer array includes a set of transducer elements arranged on a surface extending in at least two dimensions. The transducer elements are controllable in response to a control signal so as to emit the acoustic energy at a wavelength and a phase delay determined by the control signal. A controller generates the control signal such that interfering incident and reflected waves of the acoustic energy emitted towards an acoustically reflective surface form an effective standing wave pattern, where first and second pressure maximum regions are created at first and second distances respectively from the acoustically reflective surface, which first and second pressure maximum regions are of opposite phase to one another, and a pressure minimum point is created between the first and second pressure maximum regions.

17 Claims, 3 Drawing Sheets

(58) Field of Classification Search
CPC . B06B 1/0637; B06B 2201/70; B06B 1/0215; B06B 1/0625
See application file for complete search history.

(56) References Cited

U.S. PATENT DOCUMENTS

| | | | | |
|---|---|---|---|---|
| 4,841,495 | A * | 6/1989 | Danley | G10K 11/025 73/570.5 |
| 8,166,819 | B2 * | 5/2012 | Wanis | B01D 21/283 73/570.5 |
| 2017/0004819 | A1 * | 1/2017 | Ochiai | G10K 15/02 |
| 2018/0166063 | A1 | 6/2018 | Long et al. | |
| 2019/0010882 | A1 | 1/2019 | Michel et al. | |
| 2020/0384292 | A1 | 12/2020 | Menz et al. | |
| 2022/0001157 | A1 | 1/2022 | Kim et al. | |

FOREIGN PATENT DOCUMENTS

| | | | |
|---|---|---|---|
| WO | 2014029505 | A1 | 2/2014 |
| WO | 2019207143 | A1 | 10/2019 |
| WO | 2020171408 | A2 | 8/2020 |

OTHER PUBLICATIONS

Kandemir et al. "Standing wave acoustic levitation on an annular plate". Journal of Sound and Vibration. 2016 (Year: 2016).*
MYVOX AB, International Patent Application No. PCT/SE2021/051242, International Search Report, Jan. 26, 2022.
MYVOX AB, International Patent Application No. PCT/SE2021/051242, Written Opinion, Jan. 26, 2022.
MYVOX AB, Swedish Patent Application No. 2051468-3, Swedish Search Report, Aug. 31, 2021.
Li Jiyao, et al., "Study on suspension ability of concave spherical ultrasound standing wave using phased arrays", 14th IEEE International Conference on Electronic Measurement & Instruments, 2019, pp. 155-160.
Helander, Petteri, et al., "Simulating Acoustic Orientation Trapping for Stable Levitation", 2019 IEEE International Ultrasonics Symposium (IUS), 2019, pp. 650-653.
Andrade, Marco A.B., "Review of Progress in Acoustic Levitation", Brazilian Journal of Physics, 2018, pp. 190-213, vol. 48.
Nakahara, Jared, et al., "Contact-less Manipulation of Millimeter-scale Objects via Ultrasonic Levitation", 8th IEEE International Conference on Biomedical Robotics and Biomechatronics (BioRob), 2020, pp. 264-271.
Zhao, Su, et al., "A standing wave acoustic levitation system for large planar objects", Arch Appl Mech, 2011, pp. 123-139, vol. 81.
Andrade, Marco A.B., "Acoustic levitation in mid-air: Recent advances, challenges, and future perspectives", Applied Physics Letters, 2020, pp. 250501-1-250501-4, vol. 116.
Marzo, Asier, et al., "Holographic acoustic tweezers", PNAS, 2019, pp. 84-89, vol. 116, No. 1.
Gavrilov, L.R., "The Possibility of Generating Focal Regions of Complex Configurations in Application to the Problems of Stimulation of Human Receptor Structures by Focused Ultrasound", Acoustical Physics, 2008, pp. 269-278, vol. 54, No. 2.
Kono, Michinari, et al., "lapillus bug: Creature-like Behaving Particles Based on Interactive Mid-Air Acoustic Manipulation", Advances in Computer Entertainment Technology, pp. 1-8, Nov. 11, 2014.
Omirou, Themis, et al., "Floating Charts: Data Plotting using Free-Floating Acoustically Levitated Representations", 2016 IEEE Symposium on 3D User Interfaces, pp. 187-190, Mar. 19, 2016.
MYVOX AB, European Patent Application No. 21907240.2, Extended European Search Report, Aug. 22, 2024.

* cited by examiner

ACOUSTIC LEVITATION SYSTEM, COMPUTER-IMPLEMENTED METHOD FOR LEVITATING AN OBJECT, COMPUTER PROGRAM AND NON-VOLATILE DATA CARRIER

CROSS-REFERENCE TO RELATED APPLICATIONS

This application is a National Stage Patent Application (filed under 35 § U.S.C. 371) of PCT/SE2021/051242, filed Dec. 13, 2021, of the same title, which, in turn claims priority to Swedish Patent Application No. 2051468-3 filed Dec. 15, 2020, of the same title; the contents of each of which are hereby incorporated by reference.

TECHNICAL FIELD

The present invention relates generally to contactless movement of objects. Especially, the invention relates to an acoustic levitation system for moving an object relative to an acoustically reflective surface and a corresponding computer-implemented method. The invention also relates to a computer program and a non-volatile data carrier storing such a computer program.

BACKGROUND

Analogous to optic waves, acoustic waves can create radiation forces. At certain points where these forces converge traps can be created in which particles may be levitated in a stable manner. Such traps can be formed in standing wave fields in various configurations of emitter elements, for example a single sided phased array emitter emitting acoustic wave energy against an acoustically reflective surface as shown in WO 2009/106282. Acoustic traps may also be created between opposing phased array emitters as disclosed in US 2019/0108829; or by a single sided phased array emitter radiating into open space, i.e. without any nearby reflective surface, for example as described in Andrade, M. A. B., et al., "Acoustic Levitation in Mid-Air: Recent Advances, Challenges, and Future Perspectives", Appl. Phys. Lett. 116, 250501 (2020), published online 22 Jun. 2020.

Using a single sided emitter against a reflective surface creates traps at the nodes of a standing wave pattern caused by interference between the incident and reflected acoustic waves. Here, it is possible to manipulate the trap position in a plane being parallel to the reflecting surface by adjusting a focus point where the waves from several transducers interfere constructively. The plane that is parallel to the reflecting wall is often referred to as the x-y plane.

By using two opposing phased array emitters, or four phased array emitters being mutually opposing, the trap position can be manipulated in three dimensions. This may be effected by adjusting the focus point and adding a 180° phase delay on the relatively opposing arrays.

By using a single-sided phased array emitter radiating into open space, it is possible to create trap positions by holographically combining phase delays for a focus point with a trap signature. For instance, a tweezer-like twin trap may be produced consisting of two high-pressure regions of opposite phase, which create a trap in between. Alternatively, a vortex trap may be produced, which has a rotating phase around a phase singularity, creating a trap at the point of the singularity. Further, it is possible to create multiple focus points and control their relative phases by using a back-propagation algorithm. This allows for simultaneous manipulations of multiple particles. Here, the single array twin and vortex traps may be recreated by choosing the right focus points and relative phases as described in A. Marzo and B. W. Drinkwater, "Holographic Acoustic Tweezers", PNAS, Vol. 116, No. 1, pp 84-89, 2 Jan. 2019.

Consequently, solutions are known for creating acoustic traps in which objects may be caught and moved in various ways.

However, in the known solutions, it is impossible to adjust the position of such a trap in a dimension being perpendicular to the acoustically reflecting surface in a reliable and flexible manner. Namely, in this perpendicular direction, usually denoted the z direction, the trap positions are given by the relationship $\lambda(1/4+n/2)$, where $\lambda$ is the wavelength of the acoustic wave energy being used and n denotes a trap number.

Moreover, once an object is held in a trap position it is difficult to move the object continuously to another trap position. In other words, moving objects laterally with respect to an acoustically reflecting surface has been very challenging. This, in turn, is unfortunate because in many technical implementations when it is desired to pick up and relocate an object based on acoustic wave energy, an acoustically reflecting surface is present, for example in the form of a printed circuit board (PCB) or similar structure onto which the object in question is to be mounted.

SUMMARY

The object of the present invention is therefore to offer a solution that mitigates the above problem and renders it possible to levitate items at high precision with respect to the orthogonal distance to an acoustically reflective surfaces using acoustic wave energy.

According to one aspect of the invention, the object is achieved by an acoustic levitation system containing at least one acoustic transducer array and a controller. The at least one acoustic transducer array is configured to emit acoustic energy of periodically varying intensity. Each of the at least one acoustic transducer array includes a set of transducer elements arranged on a surface extending in two or three dimensions. In other words, the transducer elements are either arranged on a flat or a curved surface. The transducer elements are controllable in response to a control signal so as to emit the acoustic energy at a wavelength and a phase delay determined by the control signal. The controller is configured to generate the control signal such that interfering incident and reflected waves of the acoustic energy emitted towards an acoustically reflective surface form an effective standing wave pattern, where first and second pressure maximum regions are created at first and second distances respectively from the acoustically reflective surface. The first and second pressure maximum regions are of opposite phase to one another, and an acoustic trap in the form of a pressure minimum point is created between the first and second pressure maximum regions.

The above acoustic levitation system is advantageous because a control algorithm generating the control signal may cause the first and second pressure maximum regions to be created at any first and second distances respectively from the acoustically reflective surface. Hence, the pressure minimum point between the first and second pressure maximum regions may be controlled to an arbitrary orthogonal distance from the acoustically reflective surface for positioning objects being trapped therein.

According to one embodiment of this aspect of the invention, the controller is configured to generate the control signal such that a perpendicular distance of the pressure minimum point from the acoustically reflective surface varies over time within a levitation column. Thereby, an object trapped in the pressure minimum point may conveniently be moved away from and/or towards the acoustically reflective surface.

In particular, the controller may be configured to generate the control signal such that the perpendicular distance varies in increments smaller than ¼ of one wavelength of the acoustic energy emitted from the at least one acoustic transducer array. Preferably, the control signal is generated such that the perpendicular distance varies continuously over time. Consequently, objects may be transported smoothly and very accurately between two points in a volume near the acoustically reflective surface.

According to another embodiment of this aspect of the invention, the acoustic levitation system contains a single acoustic transducer array with a set of transducer elements arranged on a flat surface, and the acoustically reflective surface is parallel to the flat surface. Thus, a simple and compact design is accomplished, which is suitable for transporting objects over any kind of plane objects.

According to yet another embodiment of this aspect of the invention, the acoustic levitation system contains at least two acoustic transducer arrays, which are arranged opposite to one another on a respective flat surface being parallel to one another, e.g. either two opposing arrays, or four arrays being mutually opposite to one another. In any case, each of the flat surfaces is also orthogonal to the acoustically reflective surface. Thereby, objects may be moved in an efficient manner over a relatively large three-dimensional volume, i.e. in a direction orthogonal to the acoustically reflective surface as well as in directions parallel to this surface.

According to still another embodiment of this aspect of the invention, the controller is specifically configured to generate the control signal such that a position of the levitation column on the acoustically reflective surface varies over time. Hence, objects may also be moved laterally over the acoustically reflective surface.

According to a further embodiment of this aspect of the invention, the transducer elements in the at least one acoustic transducer array are arranged in a first number of rows and a second number of columns. In other words, the at least one acoustic transducer array has a general rectangular outline. This renders it comparatively straightforward to generate the control signal such that it causes a desired relocation of the acoustic trap over a plane acoustically reflective surface.

According to yet another embodiment of this aspect of the invention, the transducer elements in the at least one acoustic transducer array are arranged on a concave side of a spherical surface segment. This configuration facilitates concentrating high acoustic energies to a specific volume between the array and the acoustically reflective surface.

According to another aspect of the invention, the object is achieved by a computer-implemented method for levitating an object relative to an acoustically reflective surface. The method involves generating a control signal which is configured to cause at least one acoustic transducer array to emit acoustic energy of periodically varying intensity.

It is presumed that each of the at least one acoustic transducer arrays contains a set of transducer elements arranged on a surface extending in two or three dimensions. I.e. transducer elements are located on a flat or a curved surface. It is further presumed that the transducer elements are controllable in response to the control signal so as to emit the acoustic energy at a wavelength and a phase delay determined by the control signal. The control signal is generated such that interfering incident and reflected waves of the acoustic energy emitted towards the acoustically reflective surface form an effective standing wave pattern where first and second pressure maximum regions are created at first and second distances respectively from the acoustically reflective surface. The first and second pressure maximum regions are of opposite phase to one another, and a pressure minimum point, i.e. an acoustic trap, is created between the first and second pressure maximum regions. The advantages of this method, as well as the preferred embodiments thereof, are apparent from the discussion above with reference to the system.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
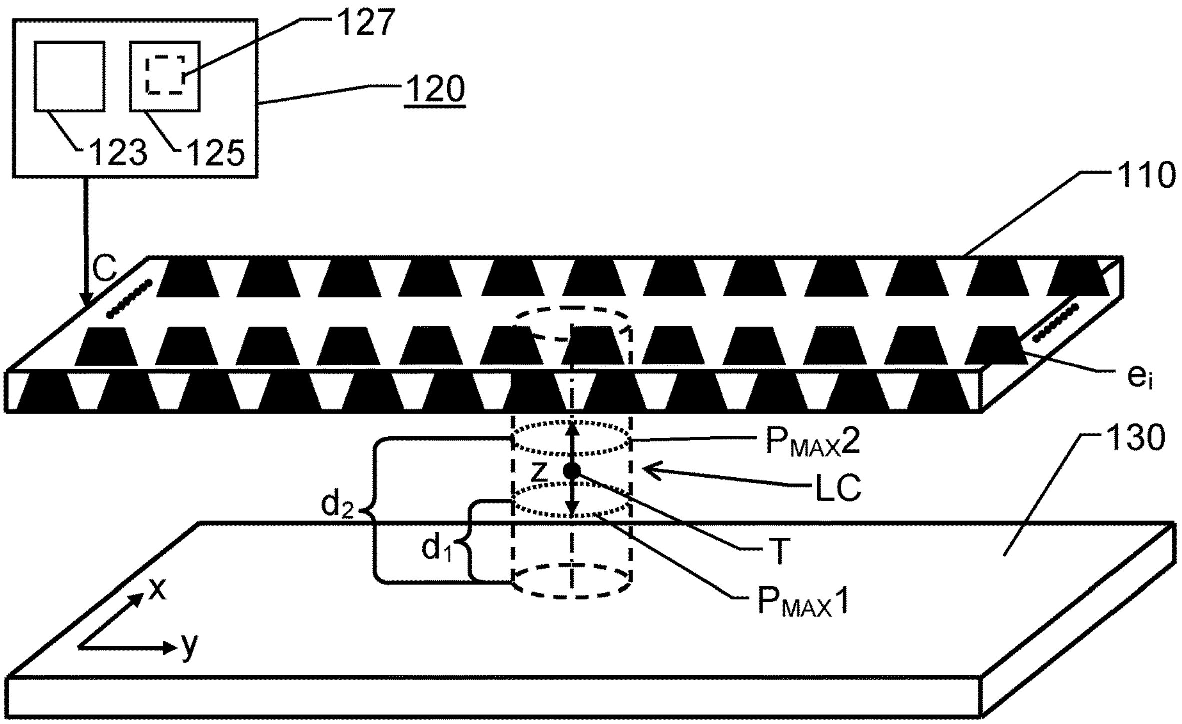
FIG. 1 shows an acoustic levitation system according to a first embodiment of the invention.

In FIG. 1, we see an acoustic levitation system according to a first embodiment of the invention.

The system includes an acoustic transducer array 110 and a controller 120. The acoustic transducer array 110 is configured to emit acoustic energy of periodically varying intensity, i.e. sound waves, at for example a frequency in an interval between 20 kHz and 200 kHz, such as around 40 kHz.

The acoustic transducer array 110, in turn, includes a set of transducer elements e, arranged on a surface. Here, the surface is flat and the transducer elements e, are arranged in a first number of rows and a second number of columns. This renders it comparatively straightforward to control the transducer elements e, to create a desired effective standing wave pattern between the acoustic transducer array 110 and an acoustically reflective surface 130 parallel to the acoustic transducer array 110. Namely, the transducer elements e, are controllable in response to a control signal C so as to emit the acoustic energy at a wavelength and a phase delay determined by the control signal C.

Figure 2:
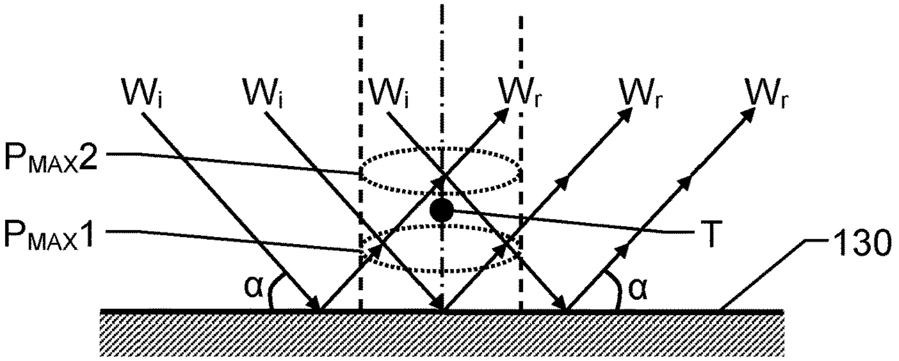
FIG. 2 schematically illustrates how interfering incident and reflected waves of acoustic energy emitted towards an acoustically reflective surface form an effective standing wave pattern with a pair of pressure maximum regions and an intermediate pressure minimum point.

FIG. 2 schematically illustrates how interfering incident waves W, and reflected waves W, of the acoustic energy emitted towards the acoustically reflective surface 130 form an effective standing wave pattern with a first pressure maximum region $P_{MAX}1$, a second pressure maximum region $P_{MAX}2$ and an intermediate pressure minimum point T. FIG. 2 shows an example where the incident waves $W_i$ hit the acoustically reflective surface 130 at an angle α and the reflected waves $W_r$ leave the acoustically reflective surface 130 at the same angle α.

The controller 120 is configured to generate the control signal C such that the interfering incident and reflected waves $W_i$ and $W_r$ respectively of the acoustic energy emitted towards the acoustically reflective surface 130 form an effective standing wave pattern, where the first pressure maximum region $P_{MAX}1$ and the second pressure maximum region and $P_{MAX}2$ are created at first and second distances $d_1$ and $d_2$ respectively from the acoustically reflective surface 130. The first and second pressure maximum regions $P_{MAX}1$ and $P_{MAX}2$ are of opposite phase to one another. Thus, the pressure minimum point T created there between is located at equal distances from the first and second pressure maximum regions $P_{MAX}1$ and $P_{MAX}2$.

Preferably, the controller 120 is configured to generate the control signal C such that a perpendicular distance z of the pressure minimum point T from the acoustically reflective surface 130 varies over time within a levitation column LC. This namely enables placing and relocation of items with respect to other items on the acoustically reflective surface 130. For example, electronic components may be placed on a PCB, caustic liquids, poisonous agents, hot plasmas or by other means hazardous entities may be handled safely. Naturally, lateral movements, i.e. in an x-y plane in parallel with the acoustically reflective surface 130 may alternatively, or additionally, be effected by moving the acoustically reflective surface 130 relative to the acoustic transducer array 110.

According to one embodiment of the invention, the controller 120 is specifically configured to relocate an object in relation to the acoustically reflective surface 130, which object is placed in the pressure minimum point T by varying a position of the pressure minimum point T at least along the z dimension, however preferably also along one or both of the x and y dimensions.

For high-precision control of the movements, it is preferable if the controller 120 is configured to generate the control signal C such that the perpendicular distance z varies continuously over time, or at least in increments smaller than ¼ of one wavelength of the acoustic energy emitted from the acoustic transducer array 110, and preferably increments smaller than 1⁄10 of one wavelength of the acoustic energy emitted from the acoustic transducer array 110. As mentioned above, in contrast to the prior-art-solutions, the invention does not rely on a relationship between the wavelength of the acoustic energy and the lateral positions to which the trap for carrying an object, i.e. the pressure minimum point T can be controlled.

Figure 3:
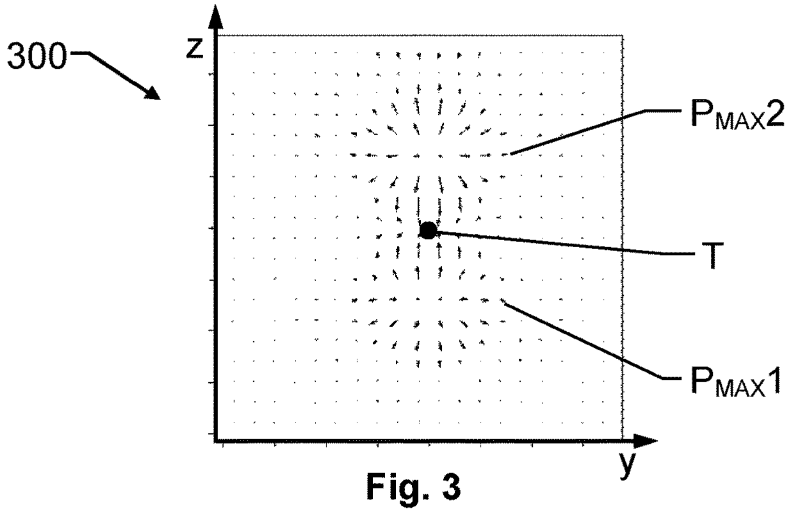
FIG. 3 shows a quiver plot of a resulting force field illustrating the pressure maximum regions and the intermediate pressure minimum point according to the invention.

FIG. 3 illustrates the above-mentioned first and second pressure maximum regions $P_{MAX}1$ and $P_{MAX}2$ and the intermediate pressure minimum point T in an alternative manner in the form of a quiver plot 300 of a resulting force field. Here, a horizontal axis y designates a dimension parallel to the acoustically reflective surface 130 and a vertical axis z designates a dimension orthogonal to the acoustically reflective surface 130. The quiver plot 300 represents magnitude and direction of the resulting force field by arrows. The effect that enables objects to be trapped in and carried by the pressure minimum point T occurs if there is a difference in pressure between the pressure in the first and second pressure maximum regions $P_{MAX}1$ and $P_{MAX}2$ and a volume surrounding these regions. The effect becomes stronger—meaning that heavier objects can be trapped and moved—if the difference in pressure between the pressure in the first and second pressure maximum regions $P_{MAX}1$ and $P_{MAX}2$ and the surrounding volume increases.

The strategy applied according to the invention may be expressed as controlling the acoustic transducer array 110 such that an acoustic pressure node is created close to a desired location for the trap, i.e. the pressure minimum point T. This is similar to the "twin" trap used in the above-mentioned single-sided phased array emitter. However, instead of creating focus points on either side of the trap in the x-y plane, focus points are here created at different positions along the z-axis in the form of said first and second pressure maximum regions $P_{MAX}1$ and $P_{MAX}2$. Thereby, a stabile trap can be generated at an arbitrary orthogonal distance from the acoustically reflective surface 130. Ideally, the phase delay in first and second pressure maximum regions $P_{MAX}1$ and $P_{MAX}2$ should be opposite, i.e. differ by 180°. Of course, this cri-terion is not perfectly sharp, which means that it also works for minor deviations from 180°, however less efficiently.

The controller 120 may apply any algorithm that allows for generating a control signal C causing the acoustic transducer array 110 to generate multiple focus points with relative phases to produce the first and second pressure maximum regions $P_{MAX}1$ and $P_{MAX}2$ and the resulting trap in the form of the pressure minimum point T there between. For example, the controller 120 may employ an iterated backpropagation algorithm as described in A. Marzo and B. W. Drinkwater, "Holographic Acoustic Tweezers", PNAS, Vol. 116, No. 1, pp 84-89, 2 Jan. 2019. Alternatively, the so-called Broyden-Fletcher-Goldfarb-Shanno (BFGS) algorithm may be used, which is an iterative method for solving unconstrained nonlinear optimization problems. Moreover, the controller 120 may use the algorithm described in L. R. Gavrilov, "The Possibility of Generating Focal Regions of Complex Configurations in Application to the Problems of Stimulation of Human Receptor Structures by Focused Ultrasound", Acoustical Physics, 2008, Vol. 54, No. 2, pp. 269-278, DOI: 10.1134/S1063771 008020152.

When the desired trap location coincides with a natural standing wave node, the algorithm based upon which the controller 120 generates the control signal C behaves in a manner similar to that of a simple standing wave setup. When the desired trap location does not coincide with a natural standing wave node, the algorithm utilizes the fact that transducer elements further away from the levitation column LC reflect at an angle α against the acoustically reflective surface 130 and thus have alternative effective standing wave nodes. This will cause the actual trap location to deviate slightly from the desired trap location, and the strength of the trap to vary significantly depending on the perpendicular distance z of the pressure minimum point T from the acoustically reflective surface 130. Such deviations in the trap location can be rectified using a simple adjustment algorithm. The perturbation is continuous, and it is thus still possible to create a trap in any location. The variation in strength is unavoidable. However, even at its lowest strength, enough lifting force can be generated to levitate light particles.

Figure 4:
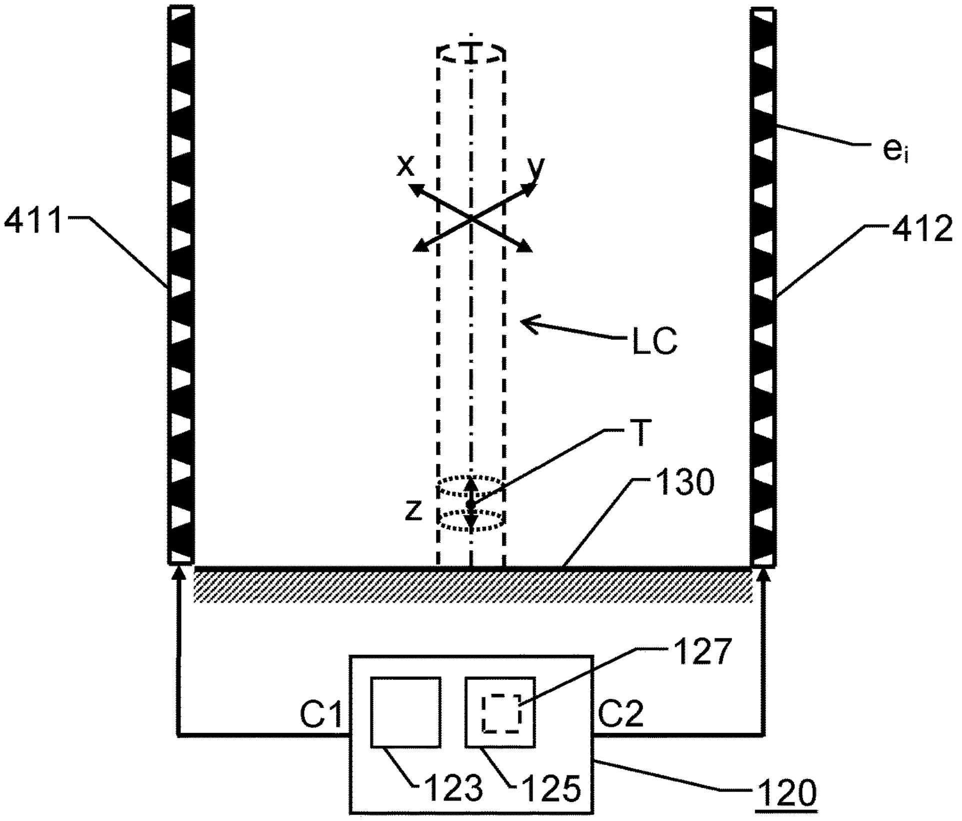
FIG. 4 shows an acoustic levitation system according to a second embodiment of the invention.

FIG. 4 shows an acoustic levitation system according to a second embodiment of the invention, where two acoustic transducer arrays 411 and 412 respectively are arranged opposite to one another on a respective flat surface being parallel to one another. Further, each of the flat surfaces is orthogonal to the acoustically reflective surface 130.

Analogous to the above, each of the acoustic transducer arrays 411 and 412 is configured to emit acoustic energy of periodically varying intensity. Each of the acoustic transducer arrays 411 and 412 also includes a set of transducer elements e, arranged on a surface extending in two dimensions. The transducer elements e, of the acoustic transducer arrays 411 and 412 are controllable in response to a respective control signal C1 and C2 so as to emit the acoustic energy at a wavelength and a phase delay determined by the control signals C1 and C2.

In this embodiment of the invention, the controller 120 is configured to generate the control signals C1 and C2 such that interfering incident and reflected waves $W_i$ and $W_r$ of the acoustic energy emitted from the acoustic transducer arrays 411 and 412 towards the acoustically reflective surface 130 form an effective standing wave pattern, where first and second pressure maximum regions $P_{MAX}1$ and $P_{MAX}2$ are created at first and second distances $d_1$ and $d_2$ respectively from the acoustically reflective surface 130. Also here the first and second pressure maximum regions $P_{MAX}1$ and $P_{MAX}2$ are of opposite phase to one another, and a pressure minimum point T is created between the first and second pressure maximum regions $P_{MAX}1$ and $P_{MAX}2$.

Preferably, the controller 120 is configured to generate the control signals C1 and C2 such that the perpendicular distance z of the pressure minimum point T from the acoustically reflective surface 130 varies over time within the levitation column LC, for example as illustrated in FIG. 4. The configuration of FIG. 4 is advantageous because it enables the levitation column LC to be high and extend essentially as long from the acoustically reflective surface 130 as the acoustic transducer arrays 411 and 412 extend there from.

Figure 5:
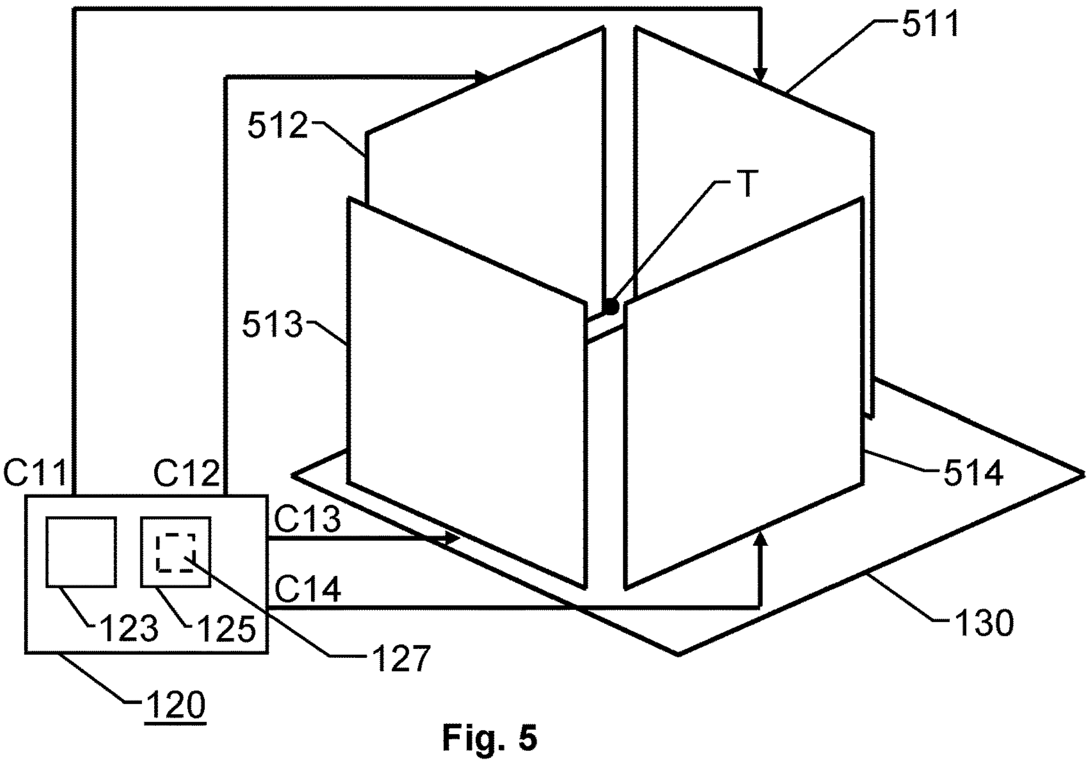
FIG. 5 shows an acoustic levitation system according to a third embodiment of the invention.

FIG. 5 shows an acoustic levitation system according to a third embodiment of the invention, where, basically, the setup of acoustic transducer arrays has been doubled relative to the embodiment shown in FIG. 4. Specifically, in the third embodiment of the invention, four acoustic transducer arrays 511, 512, 513 and 514 respectively are arranged pairwise opposite to one another.

The four acoustic transducer arrays 511, 512, 513 and 514 are arranged on a respective flat surface being pairwise parallel to the opposing array, i.e. here a first acoustic transducer array 511 is parallel to a third acoustic transducer array 511, and a second acoustic transducer array 512 is parallel to a fourth acoustic transducer array 514. Each of the flat surfaces is also orthogonal to the acoustically reflective surface 130.

Each of the acoustic transducer arrays 511, 512, 513 and 514 is configured to emit acoustic energy of periodically varying intensity. Each of the acoustic transducer arrays 511, 512, 513 and 514 also includes a set of transducer elements (not shown) arranged on a surface extending in two dimensions. The transducer elements of the acoustic transducer arrays 511, 512, 513 and 514 are controllable in response to a respective control signal C11, C12, C13 and C14 so as to emit the acoustic energy at a wavelength and a phase delay determined by the control signals C11, C12, C13 and C14.

Figure 6:
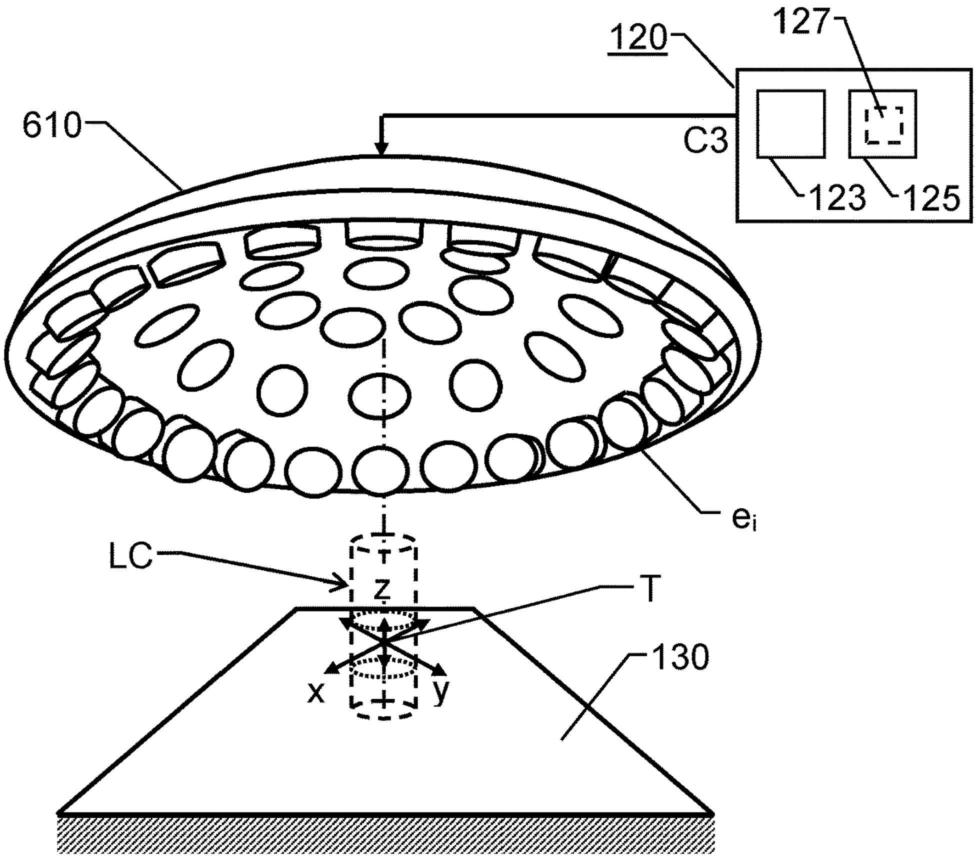
FIG. 6 shows an acoustic levitation system according to a fourth embodiment of the invention.

FIG. 6 shows an acoustic levitation system according to a fourth embodiment of the invention. Here, the transducer elements e, in the acoustic transducer array 610 are arranged on a concave side of a spherical surface segment, i.e. a surface extending in three dimension. This configuration is advantageous because it enables a higher concentration of acoustic energy towards levitation column LC so that heavier objects can be levitated than if the acoustic transducer array had extended along a flat—two-dimensional—surface.

In all the embodiments of the invention described above with reference to FIGS. 1 to 6 it is desirable if the controller 120 is configured to generate the control signal(s) C; C1, C2, C11, C12, C13, C14 and C3 respectively such that a position in the x-y plane of the levitation column LC on the acoustically reflective surface 130 varies over time. Namely, this constitutes a useful supplement to moving the entire acoustically reflective surface 130 relative to the acoustic transducer array(s).

It is generally advantageous if the controller 120 is configured to effect the above-described procedure in an automatic manner by executing a computer program 127. Therefore, the controller 120 may include a memory unit 126, i.e. non-volatile data carrier, storing the computer program 127, which, in turn, contains software for making processing circuitry in the form of at least one processor 123 in the controller 120 execute the actions mentioned in this disclosure when the computer program 127 is run on the at least one processor 123.

Figure 7:
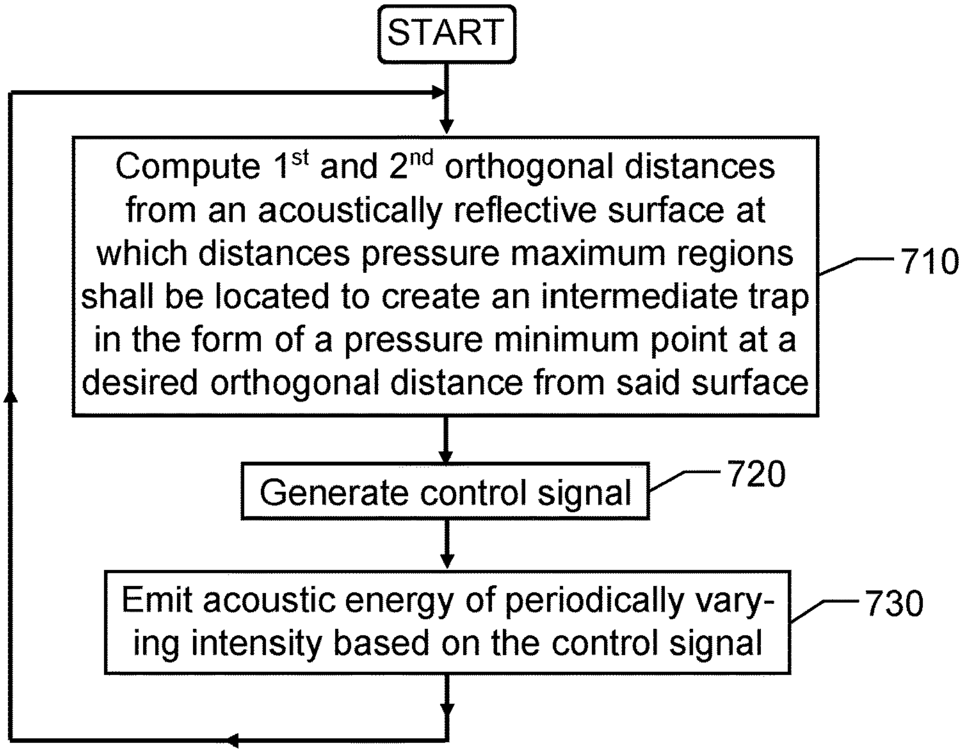
FIG. 7 illustrates, by means of a flow diagram, the general method according to a preferred embodiment of the invention.

In order to sum up, and with reference to the flow diagram in FIG. 7, we will now describe the computer-implemented method according to one embodiment of the invention.

In a first step 710, orthogonal distances $d_1$ and $d_2$ from an acoustically reflective surface 130 are computed, which orthogonal distances $d_1$ and $d_2$ designate where first and second pressure maximum regions $P_{MAX}1$ and $P_{MAX}2$ respectively shall be located with opposite phase to one another to create a trap between them in the form of a pressure minimum point T at a desired orthogonal distance z from the acoustically reflective surface 130, which orthogonal distance $z=(d_1+d_2)/2$.

Then, in a step 720, a control signal is generated, which control signal is configured to cause at least one acoustic transducer array to emit acoustic energy of periodically varying intensity towards the acoustically reflective surface 130. It is presumed that each of the at least one acoustic transducer array includes a set of transducer elements arranged on a surface extending in two or three dimensions. It is further presumed that the transducer elements are controllable in response to the control signal so as to emit the acoustic energy at a wavelength and a phase delay determined by the control signal. The control signal is generated such that interfering incident and reflected waves of the acoustic energy emitted towards the acoustically reflective surface 130 form an effective standing wave pattern, where the first and second pressure maximum regions $P_{MAX}1$ and $P_{MAX}2$ are created at the first and second distances $d_1+d_2$ respectively from the acoustically reflective surface 130. The pressure minimum point T created between the first and second pressure maximum regions $P_{MAX}1$ and $P_{MAX}2$ represents a trap suitable for carrying and levitating an item relative to the acoustically reflective surface 130.

In a subsequent step 730, the at least one acoustic transducer array emits acoustic energy towards the acoustically reflective surface 130, which acoustic energy has a wavelength and a phase delay determined by the control signal. Thereafter, the procedure loops back to step 710.

All of the process steps, as well as any sub-sequence of steps, described with reference to FIG. 7 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Variations to the disclosed embodiments can be understood and effected by those skilled in the art in practicing the claimed invention, from a study of the drawings, the disclosure, and the appended claims.

The term "comprises/comprising" when used in this specification is taken to specify the presence of stated features, integers, steps or components. The term does not preclude the presence or addition of one or more additional elements, features, integers, steps or components or groups thereof. The indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

It is also to be noted that features from the various embodiments described herein may freely be combined, unless it is explicitly stated that such a combination would be unsuitable.

The invention is not restricted to the described embodiments in the figures, but may be varied freely within the scope of the claims.

The invention claimed is:

1. An acoustic levitation system comprising:

at least one acoustic transducer array configured to emit acoustic energy of periodically varying intensity, each of the at least one acoustic transducer array comprising a set of transducer elements arranged on a surface extending in two or three dimensions, the transducer elements being controllable in response to a control signal so as to emit the acoustic energy at a wavelength and a phase delay determined by the control signal; and a controller configured to generate the control signal, where the control signal is configured to cause the transducer elements to emit interfering incident and reflected waves of the acoustic energy directed towards an acoustically reflective surface to thereby form an effective standing wave pattern where first and second pressure maximum regions are created at independently controllable first and second distances respectively from the acoustically reflective surface based on the control signal, where the first and second pressure maximum regions are of opposite phase to one another, and a pressure minimum point is created between the first and second pressure maximum regions.

2. The acoustic levitation system according to claim 1, wherein the controller is configured to generate the control signal such that a perpendicular distance of the pressure minimum point from the acoustically reflective surface varies over time within a levitation column.

3. The acoustic levitation system according to claim 2, wherein the controller is configured to generate the control signal such that the perpendicular distance varies in increments smaller than ¼ of one wavelength of the acoustic energy emitted from the at least one acoustic transducer array.

4. The acoustic levitation system according to claim 2, wherein the controller is configured to generate the control signal such that the perpendicular distance varies continuously over time.

5. The acoustic levitation system according to claim 1, comprising a single acoustic transducer array with a set of transducer elements arranged on a flat surface, and the acoustically reflective surface is parallel to the flat surface.

6. The acoustic levitation system according to claim 1, comprising at least two acoustic transducer arrays arranged opposite to one another on a respective flat surface being parallel to one another, and each of the flat surfaces being orthogonal to the acoustically reflective surface.

7. The acoustic levitation system according to claim 6, comprising four acoustic transducer arrays arranged pairwise opposite to one another.

8. The acoustic levitation system according to claim 2, wherein the controller is configured to generate the control signal such that a position of the levitation column on the acoustically reflective surface varies over time.

9. The acoustic levitation system according to claim 1, wherein the transducer elements in the at least one acoustic transducer array are arranged in a first number of rows and a second number of columns.

10. The acoustic levitation system according to claim 1, wherein the transducer elements in the at least one acoustic transducer array are arranged on a concave side of a spherical surface segment.

11. The acoustic levitation system according to claim 1, wherein the controller is configured to relocate an object in relation to the acoustically reflective surface, which object is placed in the pressure minimum point, by varying a position of the pressure minimum point.

12. A computer-implemented method for levitating an object relative to an acoustically reflective surface, the method comprising:

generating a control signal configured to cause at least one acoustic transducer array to emit acoustic energy of periodically varying intensity, each of the at least one acoustic transducer arrays comprising a set of transducer elements arranged on a surface extending in two or three dimensions, and the transducer elements being controllable in response to the control signal so as to emit the acoustic energy at a wavelength and a phase delay determined by the control signal, and the control signal being generated is configured to cause the transducer elements to emit interfering incident and reflected waves of the acoustic energy directed towards the acoustically reflective surface to thereby form an effective standing wave pattern where first and second pressure maximum regions are created at independently controllable first and second distances respectively from the acoustically reflective surface based on the control signal, where the first and second pressure maximum regions are of opposite phase to one another, and a pressure minimum point is created between the first and second pressure maximum regions.

13. The method according to claim 12, comprising:

generating the control signal such that a perpendicular distance from the acoustically reflective surface varies over time within a levitation column.

14. The method according to claim 13, comprising:

generating the control signal such that the perpendicular distance varies in increments smaller than ¼ of one wavelength of the acoustic energy emitted from the at least one acoustic transducer array.

15. The method according to claim 12, comprising:

generating the control signal such that a position of the levitation column on the acoustically reflective surface varies over time.

16. The method according to claim 12, comprising:

relocating an object in relation to the acoustically reflective surface, which object is placed in the pressure minimum point, by varying a position of the pressure minimum point.

17. A computer program product comprising computer program code stored on a non-transitory computer-readable medium, said computer program product configured for levitating an object relative to an acoustically reflective surface, said computer program code comprising computer instructions to cause at least one processing unit to perform the following operation:

generating a control signal configured to cause at least one acoustic transducer array to emit acoustic energy of periodically varying intensity, each of the at least one acoustic transducer arrays comprising a set of transducer elements arranged on a surface extending in two or three dimensions, and the transducer elements being controllable in response to the control signal so as to emit the acoustic energy at a wavelength and a phase delay determined by the control signal, and the control signal being generated is configured to cause the transducer elements to emit interfering incident and reflected waves of the acoustic energy directed towards the acoustically reflective surface to thereby form an effective standing wave pattern where first and second pressure maximum regions are created at independently controllable first and second distances respectively from the acoustically reflective surface based on the control signal, where the first and second pressure maximum regions are of opposite phase to one another, and a pressure minimum point is created between the first and second pressure maximum regions.

* * * * *